United States Patent [19]

Kitabayashi

[11] 4,333,311
[45] Jun. 8, 1982

[54] WAVE ENERGY CONVERTING DEVICE

[76] Inventor: Siichi Kitabayashi, No. 919-12, Oaza Koshikiya, Ageo-shi, Saitama, Japan

[21] Appl. No.: 83,793

[22] Filed: Oct. 11, 1979

[30] Foreign Application Priority Data

Jun. 25, 1979 [JP] Japan .................................. 54-79849

[51] Int. Cl.³ .......................................... F03B 13/12
[52] U.S. Cl. ...................................... 60/496; 405/76
[58] Field of Search ............... 60/398, 639, 496, 495, 60/497; 405/76; 290/42; 417/330; 415/6

[56] References Cited

U.S. PATENT DOCUMENTS

| 7,657 | 7/1833 | Spafford | 60/496 |
| 169,269 | 10/1875 | Johnson | 60/496 |
| 576,132 | 2/1897 | Kruse | 416/197 A |
| 1,153,235 | 9/1915 | McFarlane | 415/6 |
| 2,305,203 | 12/1942 | Smith | 60/496 X |
| 2,700,874 | 2/1955 | Roure | 405/76 |

FOREIGN PATENT DOCUMENTS

| 2394691 | 1/1979 | France | 60/496 |
| 610459 | 10/1960 | Italy | 60/496 |
| 7013 | of 1888 | United Kingdom | 60/496 |

Primary Examiner—Irwin C. Cohen
Attorney, Agent, or Firm—Fulwider, Patton, Rieber, Lee & Utecht

[57] ABSTRACT

A wave energy converting device disposed on the wave in the sea comprises a rotary shaft; a rotary hollow sleeve containing the rotary shaft therein; a plurality of partition walls for partitioning said hollow sleeve into a plurality of compartments; a plurality of radial plates each secured to the rotary shaft and said rotary sleeve to thereby form a plurality of water chambers; and plurality of first ports each formed in the rotary sleeve at the trailing end of each water chamber and adjacent to the radial plate corresponding to each water chamber.

8 Claims, 7 Drawing Figures

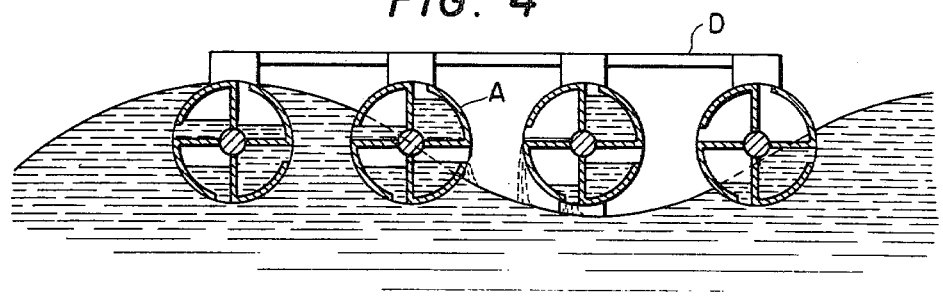
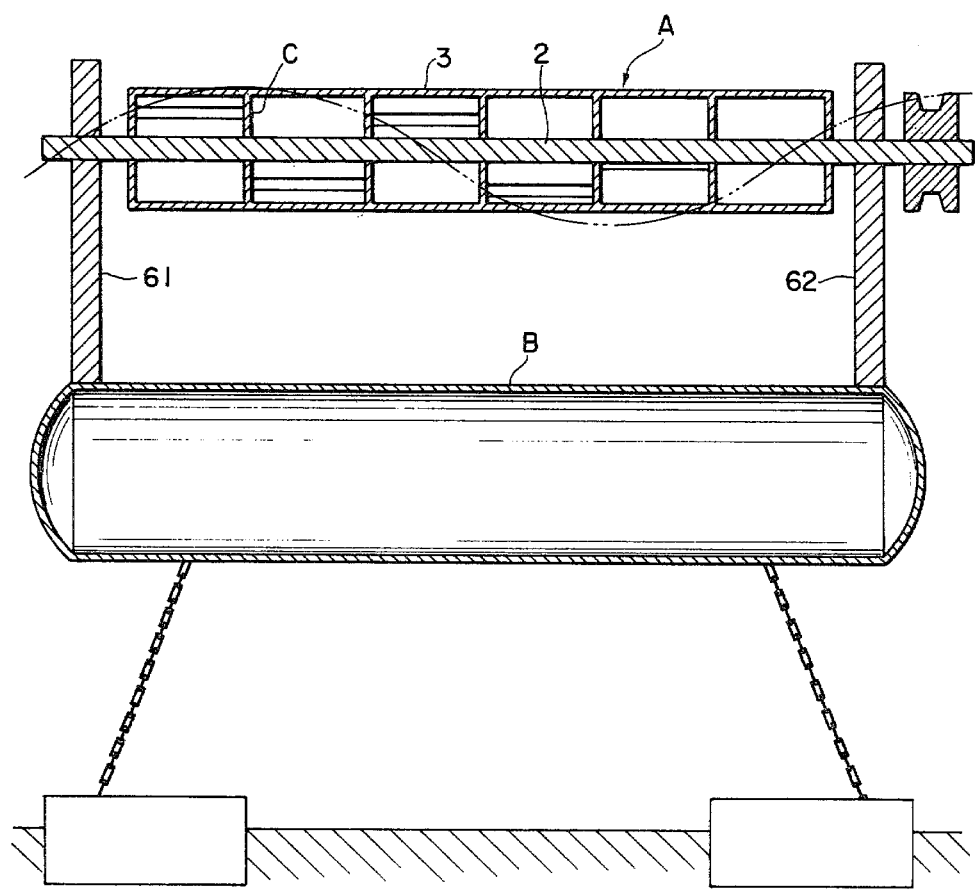

WAVE ENERGY CONVERTING DEVICE

CROSS REFERENCE TO RELATED APPLICATIONS

Applicant claims priority under 35 U.S.C. 119, under Japanees patent application No. 79849/76, filed on June 25, 1979.

BACKGROUND OF THE INVENTION

This invention relates to a wave energy converting device used for converting reciprocating energy of waves generated in the sea into usable rotational energy. The wave energy converting device is simple in its construction but is practically usable.

There have been heretofore provided various devices which are used for converting reciprocating energy of water in the form of a wave into mechanical or electrical usable energy.

However, such devices are very large in size and complicated having drawbacks that the devices are liable to be out of order. Therefore, such devices have not yet been practically used.

SUMMARY OF THE INVENTION

In view of the above noted defects inherent to the conventional devices, the present invention provides a novel and simple wave energy converting device which is not necessarily large and has possible minimum trouble and which is practical.

This and other objects are achieved by providing a wave energy converting device disposed on the wave in the sea and comprising a rotary shaft; a rotary hollow sleeve containing the rotary shaft therein; a plurality of partition walls for partitioning said hollow sleeve into a plurality of compartments; a plurality of radial plates each secured to the rotary shaft and said rotary sleeve to thereby form a plurality of water chambers; and a plurality of first ports each formed in the rotary sleeve at the trailing end of each water chamber and adjacent to the radial plate corresponding to each water chamber.

BRIEF DESCRIPTION OF THE DRAWINGS

In the accompanying drawings in which:

FIG. 4 is a cross sectional view of the device of first embodiment according to the present invention;

FIG. 5 is a longitudinal sectional view of the device shown in FIG. 4; and

DETAILED DESCRIPTION OF THE PREFERRED EMBODIMENTS

Figure 1:
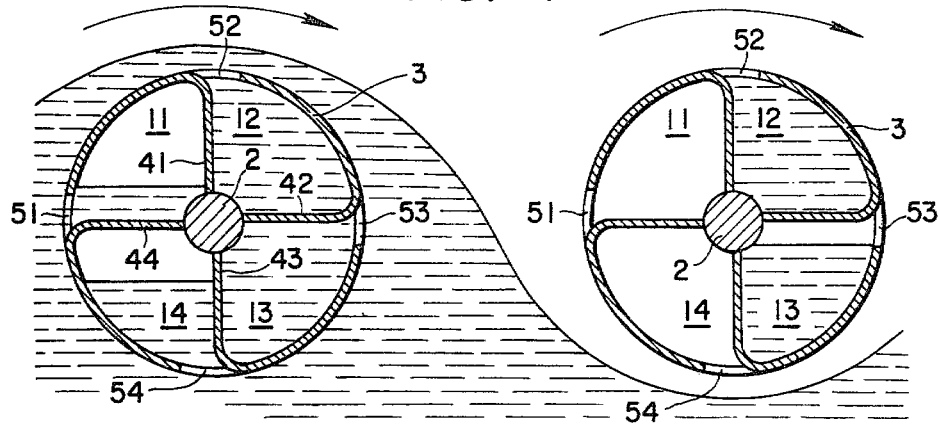
FIGS. 1 to 3 show a successive illustration of the operation of the first embodiment according to the present invention.

The present invention will be hereinafter described in reference to the accompanied drawings. In FIG. 5, reference character A designates a rotary sleeve according to the present invention. The rotary sleeve A is secured to a main shaft 2 rotatably supported by a pair of arms 61 and 62 extending from a buoy tank B which is held in the sea water as shown. As shown in FIG. 5, the rotary sleeve A is separated by a plurality of partitioning walls C into a plurality of compartments. Of course, any manner to separate the sleeve A may be used in consideration of a dimension or mechanical strength of the sleeve A. Also, if necessary, no partition wall is used.

Referring now to FIGS. 1 to 4, the detailed mechanism of the sleeve A will be hereinafter described. Reference numerals 41 to 44 designate a plurality of radial partition plates which each extend from the shaft 2 to the outer wall 3 of the sleeve. The inner chamber of the sleeve is divided into a plurality of (four in the embodiment) water chambers 11 to 14 by the radial plates 41 to 44. A through hole 51, 52, 53 or 54 is formed at a position corresponding to each water chamber. Each of the holes 51 to 54 is provided at a trailing end adjacent to each radial plate.

The rotary sleeve A is thus constructed. In a case where a plurality of the rotary sleeves are required, it is desirable that more than four rotary sleeves are employed in order to reduce a whole torque variation as shown in FIG. 4. However, for ready understanding of the present invention, FIGS. 1 to 3, the rotary sleeve on the left side is below the wave while the rotary sleeve on the right side is above the wave. The wave moves from the left to the right.

The rotary sleeve on the left side of FIG. 1 is initially above the wave while the water chambers 11 to 14 are all empty. Thereafter, the rotary sleeve on the left side is as shown is FIG. 1 covered with the water during a short period of time. At this time, the radial plates 41 and 43 are vertical while the radial plates 42 and 44 are horizontal. Since the ports 51 and 54 are, as shown, formed at the trailing end near the respective radial plates, with respect to the water chamber 11 water enters through the port 51 thereinto. In this case, since the port 51 is positioned at a lower portion of the chamber 11, when water enters into the chamber 11 to some extent, air therewithin cannot escape and is maintained in the chamber 11 to thereby stop the introduction of water thereinto. With respect to the water chamber 14, air resides therein in the same manner. On the other hand, with respect to the water chambers 12 and 13, since the ports 52 and 53 are, respectively, positioned at a high level in the water chambers 12 and 13, the water chambers 12 and 13 are readily filled with the water. Then, due to the buoyancies of the air enclosed in the water chambers 11 and 14 and the gravities of the water in the chambers 12 and 13, a clockwise rotational torque is generated at the shaft 2.

With respect to the rotary sleeve on the right side, this rotary sleeve is in the same state as that on the left side and, thereafter, when the wave is moved downwardly the rotary sleeve on the right side appears above the wave as shown. During the transient process from the inside to the outside of the wave surface, the water is discharged from the ports 51 and 54 which are positioned at lower portions of the respective water chamber while most water is retained in the water chambers 12 and 13 though some water in the chambers 13 escapes from the port 53. Accordingly, due to the gravitational pull of the water in the chambers 12 and 13, the same directional torque will be generated.

Figure 2:
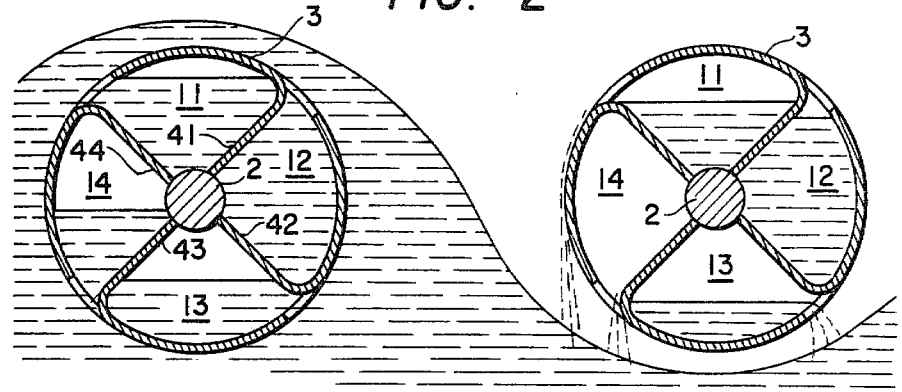

FIG. 2 shows on the left side a rotary sleeve which is previously empty and then, is slanted at an angle of 45° while sinking in water. The water chamber 11 is substantially filled with water and the water chamber 12 is completely filled with water. However, the water chambers 13 and 14 contains air in part because the corresponding ports are positioned at lower portions thereof. The water chambers 11 and 13 have the gravities of water and the buoyancy of air, respectively. Since these chambers are positioned directly above and below the wave surface, respectively, any torque due to these chambers is not generated. However, the torque for the shaft 2 is generated due to the fact that the water chamber 14 contains air to thereby have buoyancy while the water chamber 12 contains water to have gravity.

With respect to the rotary sleeve on the right side of FIG. 2, the rotary sleeve being initially in a state shown on the left side in FIG. 2 appears above the wave surface. For the same reason as in the preceding case the water chamber 12 has water therein while the water chamber 14 contains air therein. The torque is generated in the same direction.

Figure 3:
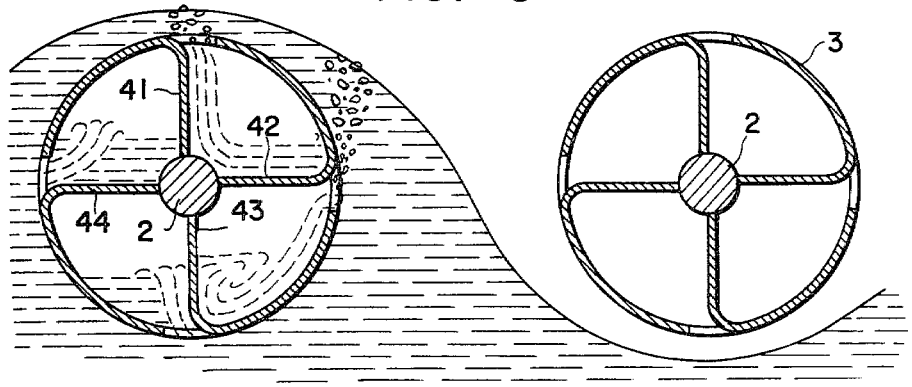

On the left side of FIG. 3 the radial partition plates 41 to 44 are positioned at the same positions as those shown in FIG. 1. However, FIG. 3 shows on the left side an initial state of the rotary sleeve into which water is introduced. Therefore, no torque is yet generated. On the right side of FIG. 3, the rotary sleeve is above the wave surface and all of chambers are empty. Of course in this case no torque is generated.

As mentioned above, one-directional torque is generated in the rotary sleeves except for case shown in FIG. 3. In order to always obtain uniform torque though the speed and the period of the wave is not necessarily stable or constant, a plurality of the rotary sleeves may be used, as shown in FIG. 4. For this, all the rotary sleeves are connected through chain and sprocket machanism well known and each of the rotary sleeves is partitioned by the partition walls into a plurality of compartments in the longitudinal axis as shown in FIG. 5. It is desirable that the compartments are displaced to each other in their topologies or phases.

Figure 6:
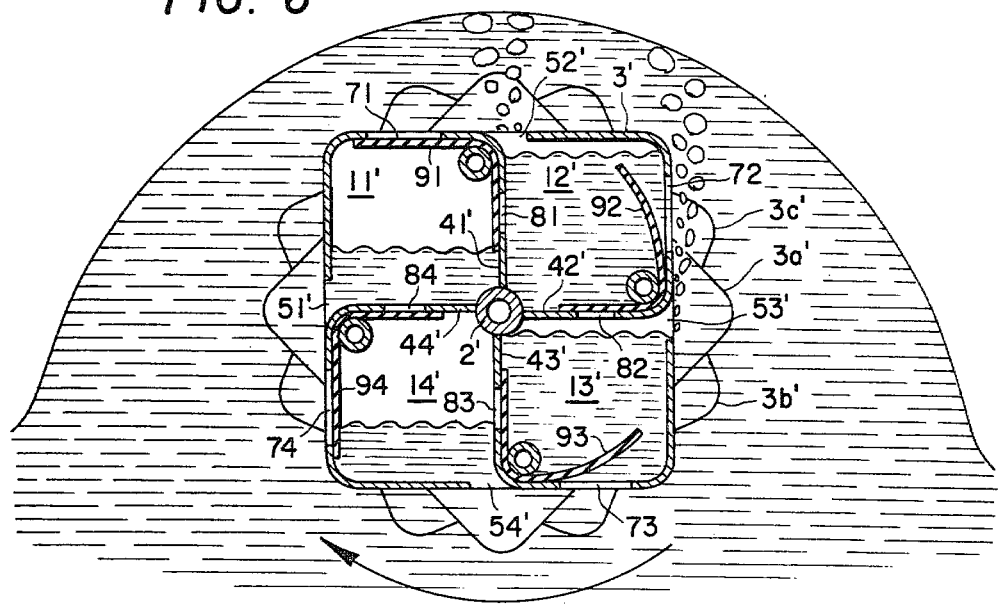
FIGS. 6 and 7 show a successive illustration of the operation of the second embodiment according to the present invention.
Figure 7:
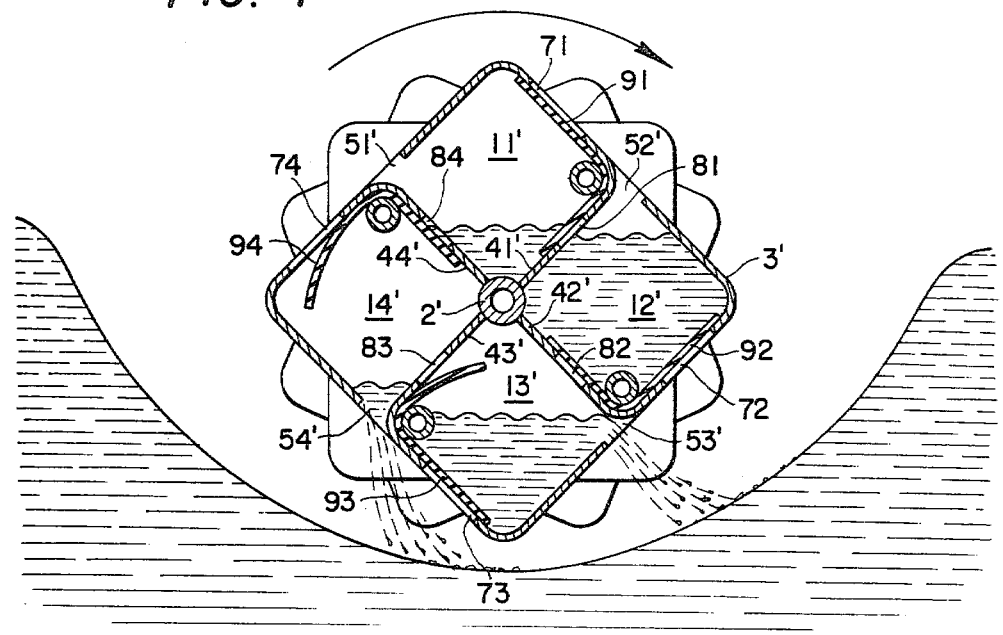

FIGS. 6 and 7 show another embodiment in which rectangular rotary sleeves 3' are used, it being appreciated that cylindrical rotary sleeves may be used. Ports 51' to 54' are formed in the rotary sleeve 3' in the same manner as in the first embodiment. At the same time other ports 71 to 74 are formed in the rotary sleeve. Each of the ports 71 to 74 is formed at leading end of each chamber which is partitioned by the radial plates 41' to 44'.

Each of radial plates 41' to 44' is provided with through holes 81, 82, 83 and 84. Valve plates 91, 92, 93 and 94 made of resilient material such as rubber are, respectively, provided to the ports 71 to 74 and 81 to 84. The valve plates 91 to 94 secured inside of the chamber are adapted to cover the ports 71 to 74 and 81 to 84 to form flapper valves. Though in the embodiment the valve plate 91 is adapted to cover both ports 71 and 81, it is possible that separate valve plates are provided to the ports 71 and 81, respectively. As shown in FIG. 6, the radial plates in one compartment 3' are displaced to those of the adjacent other compartment 3a' at an angle 45°. In this manner, the compartments 3', 3a', 3b' and 3c' are displaced to each other in phase.

As shown in cross section of FIG. 6, the rotary sleeve sinks in water, the amount of water introduced through the port 51' into the chamber 11' depends on the inner pressure of the chamber 11'. With respect to this chamber 11', the ports 71 and 81 are closed due to the increased pressure and the amount of water introduced through the port 51' is maintained at a small constant rate. The similar condition is established in the lower chamber 14'. However, with respect to the chambers 12' and 13', the respective ports 52' and 53' are positioned at high level, and therefore, air readily escapes from the chambers 12' and 13' while water is introduced into the chambers 12' and 13' through ports 72 and 73, opening the valve plates 92 and 93. Accordingly, the sleeve is rotated by the buoyancy on the left side of the compartment 3' and the gravity on the left side of the compartment 3'.

FIG. 7 shows another state of the compartment above the wave surface. In this case, the radial plates are inclined at an angle of 45°. The rotational forces are applied to the chambers 11' and 13'. Water is fully contained in the chamber 12' since the ports 72 and 82 are closed by the valve 92 while water is effectively discharged from the ports 54' since the port 74 is opened due to the reduced pressure. Accordingly, an effective torque is generated around the shaft 2'. According to this embodiment, since water is more effectively discharged from the chamber 14 shown is FIG. 7, torque can be obtained more effectively than the first embodiment.

As mentioned above, the present invention is applicable to wide field for converting the wave energy into mechanical or electrical energy which is readily used. As another aspect of the invention, when a number of rotary sleeves according to the present invention are used in the sea, the rotary sleeves serve as a device for reducing the strength of waves.

What is claimed is:

1. A wave energy converting device for partial submergence in the sea for passing thereover of waves and comprising:

a rotary shaft;

a rotary hollow sleeve formed with a peripheral wall mounted on said rotary shaft for rotation therewith in one rotational direction;

a plurality of transverse partition walls partitioning said hollow sleeve into a plurality of compartments;

a plurality of radial plates in said compartments and projecting longitudinally of said compartments, each plate spanning between said rotary shaft, said partition walls and said peripheral wall to cooperate with said peripheral wall to form a plurality of water chambers in each compartment, each chamber having radial leading and trailing plates when said sleeve is rotated in said one direction; and a plurality of first ports formed in said peripheral wall, each port being disposed closely adjacent the trailing plate of each water chamber and occupying a minor portion of the peripheral wall, means positioning said wave energy converting device partially submerged in said sea and exposed to waves passing thereover, whereby said device partially submerged in said sea with the axis of rotation of said sleeve extending horizontally for passage thereover of waves to sequentially submerge and emerge said sleeve, causes chambers having upwardly facing ports to be filled with water during submergence and chambers with downwardly facing ports to be drained during emergence, said ports being so arranged and configured relative to said water chambers and radial plates as to cause air disposed in said chambers during upward rotation of said respective chambers to the level of said longitudinal axis to be trapped to block entry of water and cause the chambers on the side of said shaft which are more nearly filled with water to be weighted downwardly relative to the chambers on the opposite side of said shaft.

2. A wave energy converting device as set forth in claim 1 wherein:
said radial plates are arranged to divide said sleeve into four water compartments.

3. A wave energy converting device according to claim 1, wherein through-holes are formed in each of said radial plates and a plurality of second ports are each formed in the rotary sleeve at the leading end of each water chamber and adjacent to the radial plate disposed on the leading side in the rotary sleeve, and a plurality of valve plates are each adapted to open and close the second ports and the through holes in response to the inner pressure of each water chamber.

4. A wave energy converting device according to claim 3, wherein a plurality of said rotary sleeves are provided and said rotary sleeves are connected through one-way transmission means to thereby obtain uniform one-directional torque.

5. A wave energy converting device according to claim 4 wherein said compartments have substantially rectangular cross sections and said sleeve is formed with four such compartments disposed 90° apart about the composite cross section of said sleeve.

6. A wave energy converting device according to claim 1 that includes plurality of sets of compartments formed in said rotary sleeve, said sets being disposed axially of one another but with the respective compartments of each set being displaced out of axial alignment with the corresponding compartment of the preceding set as one progresses axially along said shaft for progressive receipt of a wave passing axially over said sleeve.

7. A wave energy converting device according to claim 6, wherein a plurality of said rotary sleeves are provided and said rotary sleeves are connected through one-way transmission means to thereby obtain uniform one-directional torque.

8. A wave energy converting device comprising:
a frame;
a hollow sleeve rotatably mounted on said frame for rotation in one direction about a longitudinal axis, said sleeve including a peripheral wall; end walls enclosing said hollow sleeve;
a plurality of radial plates in said sleeve and dividing said sleeve into a plurality of symmetrical water chambers disposed symmetrically about such sleeve, each said chamber having leading and trailing radial plates when said sleeve is rotated in said one direction; and,
respective ports formed in said peripheral wall at the trailing plates of said respective chambers and occupying a minor portion of the peripheral wall, means positioning said wave energy converting device partially submerged in the sea and exposed to waves passing thereover, whereby said device partially submerged in said sea with the axis of rotation of said sleeve extending horizontally for passage thereover of waves to sequentially submerge and energe said sleeve, causes chambers having upwardly facing ports to be filled with water during submergence and chambers with downwardly facing ports to be drained during emergence, said ports being so arranged and configured relative to said water chambers and radial plates as to cause air disposed in said chambers during upward rotation of said respective chambers to the level of said longitudinal axis to be trapped to block entry of water and cause the chambers on the side of said shaft which are more nearly filled with water to be weighted downwardly relative to the chambers on the opposite side of said shaft.

* * * * *